(12) United States Patent
O'Donnell et al.

(10) Patent No.: US 12,575,500 B2
(45) Date of Patent: Mar. 17, 2026

(54) CHAIN GUIDE FOR GRAIN ELEVATOR OF COMBINE HARVESTER

(71) Applicants: CNH Industrial America LLC, New Holland, PA (US); CNH Industrial Belgium N.V., Zedelgem (BE)

(72) Inventors: Shaun O'Donnell, Quarryville, PA (US); Frank Duquesne, Zwevegem (BE); Denver Yoder, Manheim, PA (US); Clayton Banks, Jr., Brownstown, PA (US); Bjorn Depoortere, Zwevezele (BE); Jason Musheno, Lancaster, PA (US)

(73) Assignees: CNH Industrial America LLC, New Holland, PA (US); CNH Industrial Belgium N.V. (BE)

( * ) Notice: Subject to any disclaimer, the term of this patent is extended or adjusted under 35 U.S.C. 154(b) by 448 days.

(21) Appl. No.: 18/141,499

(22) Filed: May 1, 2023

(65) Prior Publication Data

US 2024/0365711 A1 Nov. 7, 2024

(51) Int. Cl.
*A01D 61/04* (2006.01)
(52) U.S. Cl.
CPC ..................................... *A01D 61/04* (2013.01)
(58) Field of Classification Search
CPC ...................................................... A01D 61/04
See application file for complete search history.

(56) References Cited

U.S. PATENT DOCUMENTS

| | | | |
|---|---|---|---|
| 4,358,010 A | 11/1982 | Besch | |
| 4,930,623 A | 6/1990 | Johnson et al. | |
| 5,176,247 A | 1/1993 | Counter et al. | |
| 5,453,050 A | 9/1995 | Underwood | |
| 8,276,357 B2 | 10/2012 | Brown et al. | |
| 9,046,151 B2 | 6/2015 | Yokoyama | |
| 9,295,197 B1 | 3/2016 | Veikle et al. | |
| 10,131,501 B1 | 11/2018 | Kopf | |
| 2018/0334329 A1 | 11/2018 | Kopf | |

FOREIGN PATENT DOCUMENTS

| | | |
|---|---|---|
| EP | 0930249 A1 | 7/1999 |
| EP | 1769670 A1 | 4/2007 |
| FR | 2715641 A1 | 8/1995 |
| KR | 200379756 Y1 | 3/2005 |

OTHER PUBLICATIONS

The Extended European Search Report issued Sep. 17, 2024, by the European Patent Office in corresponding European Patent Application No. 24172845.0-1105. (8 pages).

*Primary Examiner* — Claude J Brown
(74) *Attorney, Agent, or Firm* — Buchanan Ingersoll & Rooney PC

(57) ABSTRACT

A chain guide for a wall of a grain elevator of an agricultural vehicle. The chain guide includes an elongated body. A rib extends from a surface of the elongated body, the rib being configured to engage with a chain of the grain elevator. A mating surface is either formed on or in the body, and the mating surface is configured to be connected to the wall of the grain elevator.

13 Claims, 4 Drawing Sheets

CHAIN GUIDE FOR GRAIN ELEVATOR OF COMBINE HARVESTER

FIELD OF THE INVENTION

The present invention relates to agricultural vehicles, such as combine harvesters. More specifically, the present invention relates to a chain guide for a clean grain elevator of a combine harvester.

BACKGROUND OF THE INVENTION

As is described in U.S. Pat. No. 9,295,197 to CNH America LLC (the '197 Patent), which is incorporated by reference in its entirety and for all purposes, combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a clean grain elevator and deposited into a grain storage tank.

The grain elevator includes a chain that moves in a continuous loop and a series of paddles that are attached to the chain. The paddles deliver the grain from the auger trough to the grain storage tank. Tilting the elevator forward can cause the chain to have more vertical displacement when loaded with grain, causing the chain to contact a center dividing wall of the elevator. Rubbing contact between the metal chain and the metal center dividing wall might result in damage during operation.

SUMMARY OF THE INVENTION

In view of the aforementioned challenges, described herein is a chain guide support structure that provides a low friction surface for the chain to ride along thereby preventing damage to the chain and/or center dividing wall during operation.

According to one aspect of the invention, a chain guide for a wall of a grain elevator of an agricultural vehicle is provided. The chain guide includes an elongated body. A rib extends from a surface of the elongated body, the rib being configured to engage with a chain of the grain elevator. A mating surface is either formed on or in the body, and the mating surface is configured to be connected to the wall of the grain elevator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
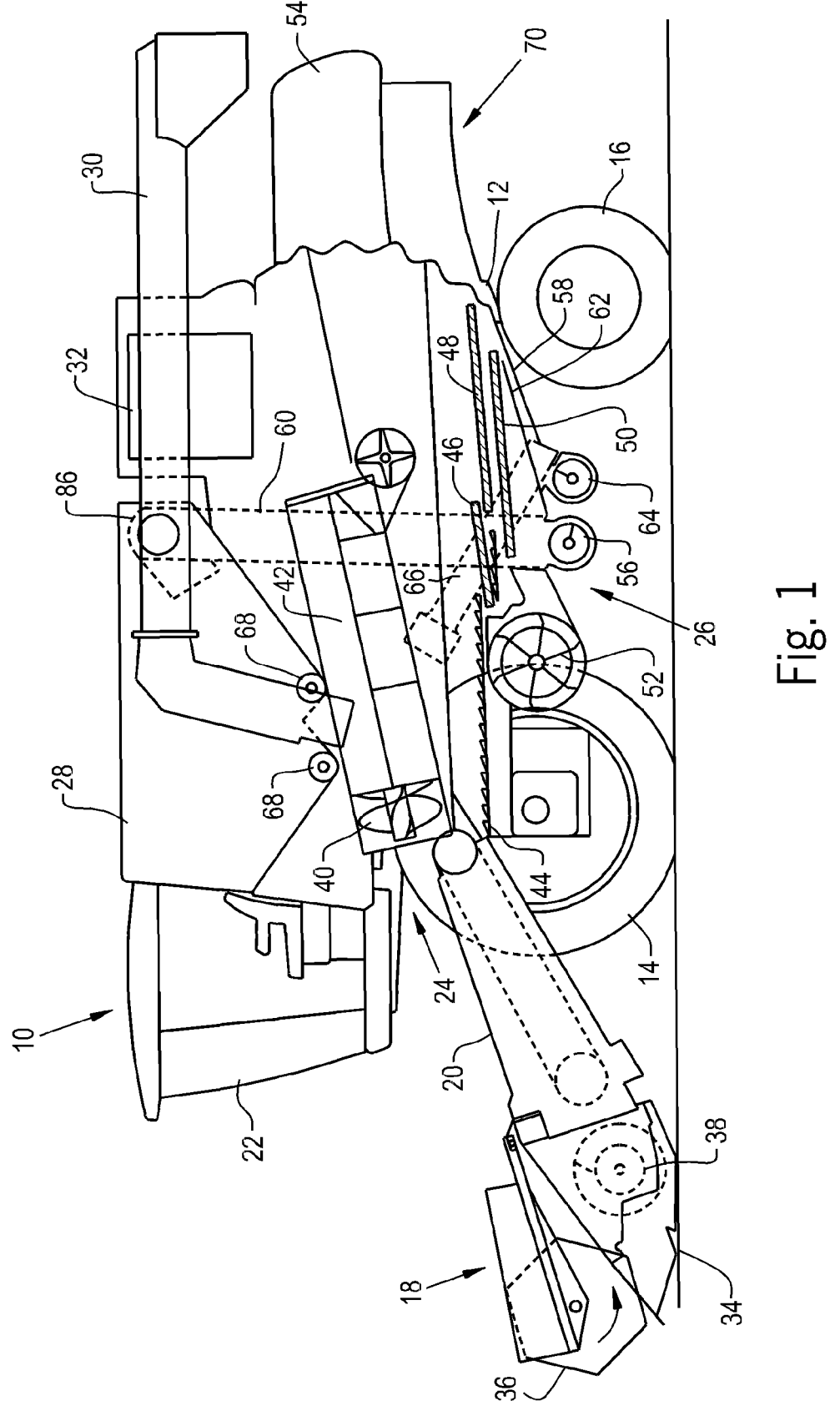
FIG. 1 is a perspective view of an embodiment of an agricultural harvester according to the present invention.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

As is described in the '197 Patent, referring now to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. Motive force is selectively applied to front wheels 14 through a power plant in the form of a diesel engine 32 and a transmission (not shown).

It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on bottom pan 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
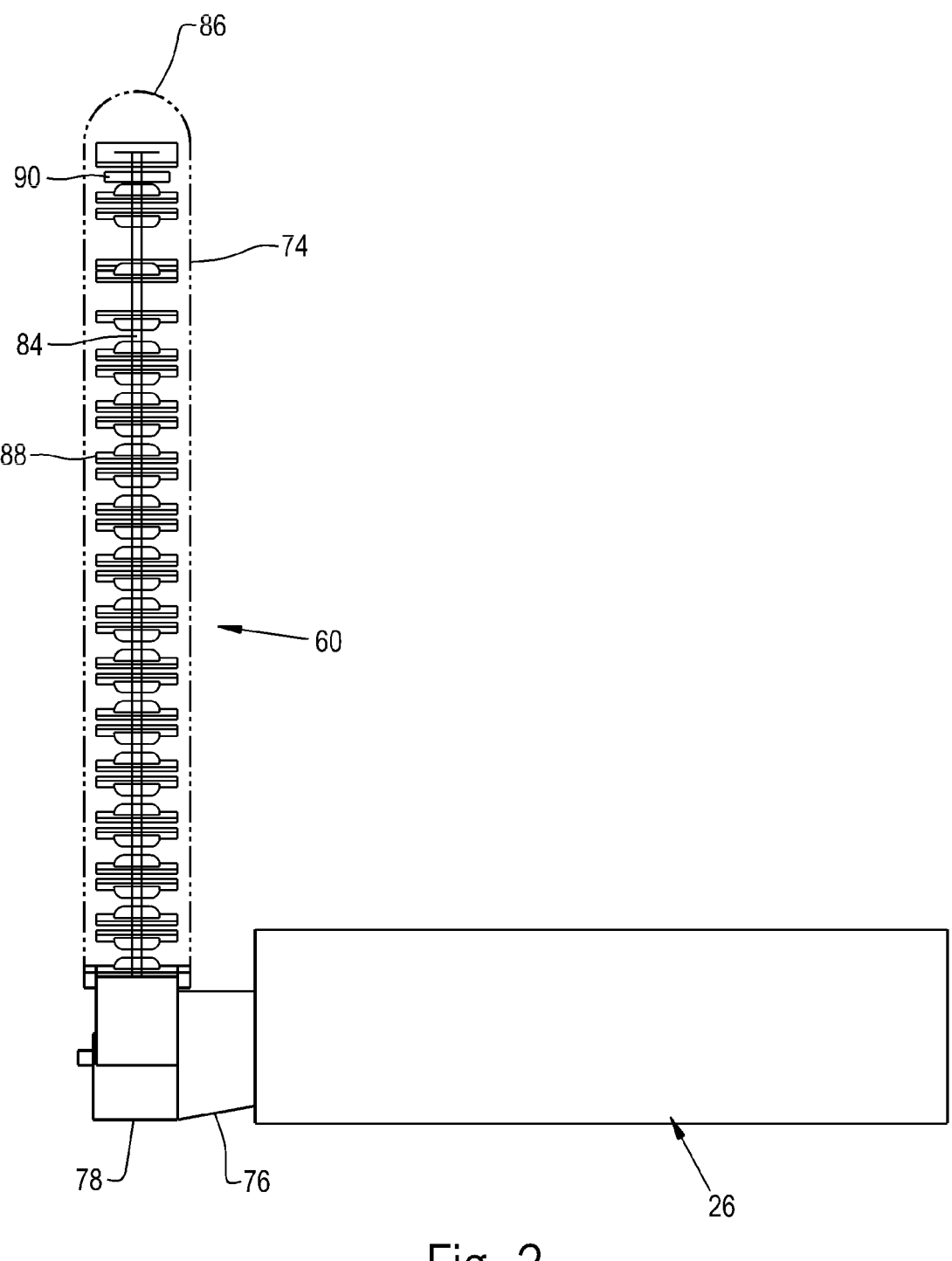
FIG. 2 is a cutaway perspective view of a portion of the agricultural harvester shown in FIG. 1, showing a portion of a cleaning system and elevator.
Figure 3:
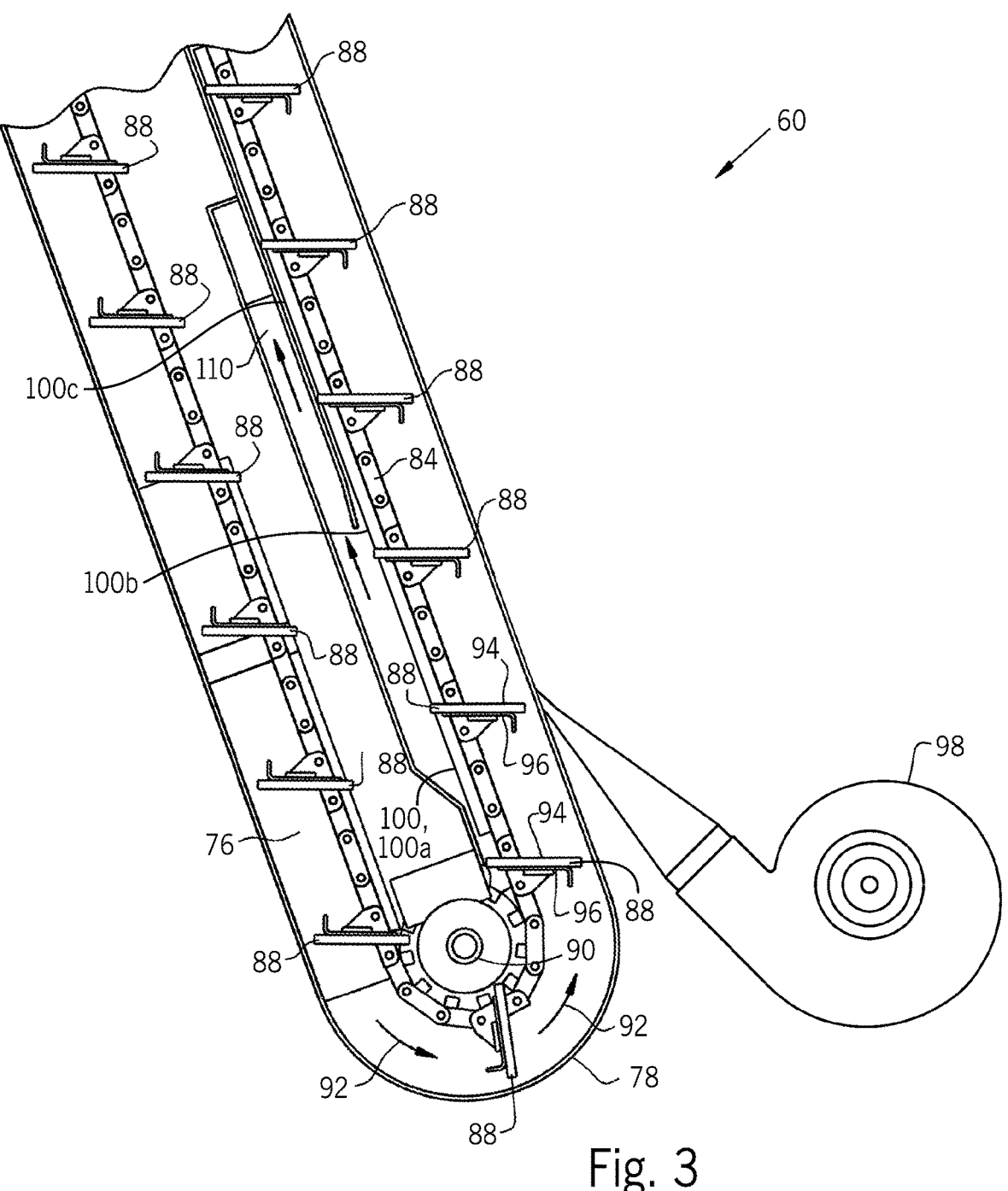
FIG. 3 is a sectional view of an embodiment of the elevator shown in FIG. 2.

Turning now to FIGS. 2 and 3, a portion of the agricultural harvester 10 with the cleaning system 26 and elevator 60 is shown in better detail. As can be seen, crop material is supplied to the elevator 60 through the cleaning system 26, which is shown generically as a block to illustrate that any sort and portion of a cleaning system could supply crop material to the elevator 60. The crop material can be supplied to the elevator 60 utilizing clean grain auger 56. It should be appreciated that the elevator 60 can be supplied with crop material from more than one auger or a mechanism besides an auger, depending on the configuration of the cleaning system.

The elevator 60 includes a housing 74 with a crop material inlet 76 supplied with clean grain from the cleaning system 26 and a boot portion 78 that forms a bottom of the housing 74. A driving loop 84, shown here as a drive chain, is held within the housing 74 and extends from the boot portion 78 of the housing 74 toward a top 86 of the housing 74. Although the driving loop 84 is shown as being a drive chain, which can also be referred to as an endless chain, the driving loop 84 could also be a belt, a cable, or other similar construction that forms a loop through the housing 74 and can be driven to rotate throughout the housing 74. Paddles 88 are connected to the driving loop 84, which can be driven by sprockets 90 to move the paddles 88 through the housing 74 along the driving loop 84 and convey clean grain from the crop material inlet 76 to the top 86 of the housing 74, where the crop material can be unloaded to the grain tank 28. Driving loop 84 may also be referred to hereinafter as a drive chain 84.

The paddles 88 rotate about the lower sprocket 90 in a counter-clockwise direction, indicated by arrow 92. In this sense, the paddles 88 each have a leading edge 94 which the crop material will rest on during vertical transport up the elevator 60 and a lagging edge 96 that is a bottom of the paddles 88. FIG. 3 depicts an optional air blower 98 and corresponding air flow channels 110. Blower 98 and channels 110 may be omitted, if so desired.

It should be understood that the components of combine 10 are not limited to that which is shown and described and may vary considerably.

Turning back to the background section, as shown in FIG. 3, the elevator 60 is tilted with respect to a vertical axis, which can cause the drive chain 84 to have more vertical displacement when loaded with grain, causing the chain 84 to contact a center dividing wall 100 of the elevator housing 74. Rubbing contact between the metal chain 84 and the metallic segments of the center dividing wall 100 could result in damage during operation.

Figure 4:
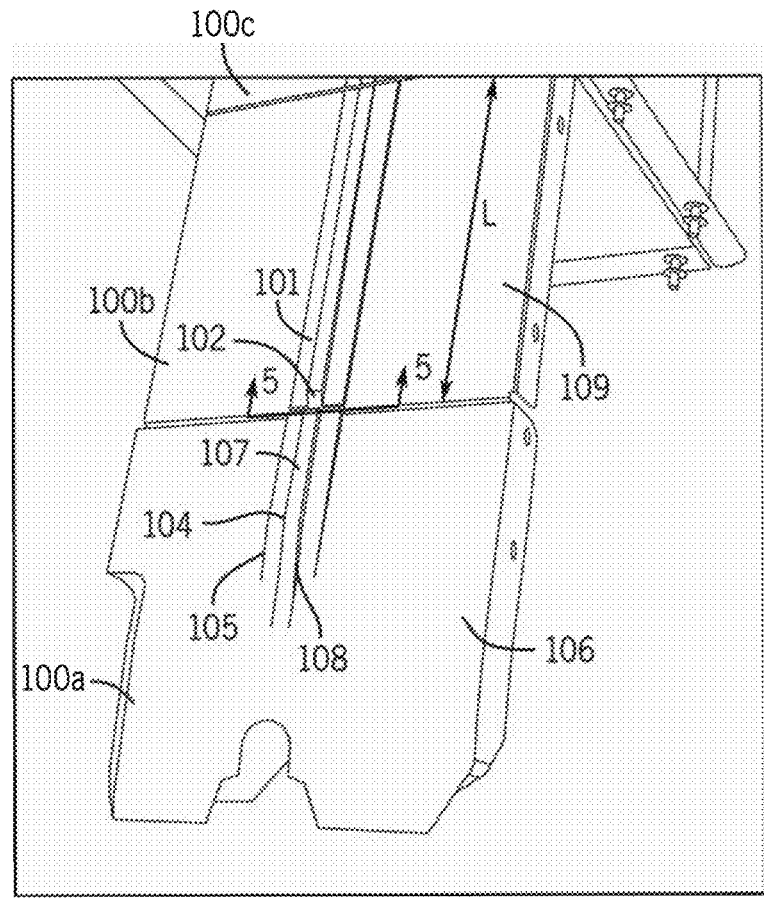
FIG. 4 is an isometric view of a segment of the center dividing wall of the elevator.

Turning now to FIGS. 3 and 4, the center dividing wall 100 of the elevator housing 74 comprises a lowermost segment 100a and stacked and interconnected wall segments 100b-100c (and more segments, though not shown). Wall segments 100a-100c together form the dividing wall 100. The segments are also flush mounted with respect to one another so that the chain 84 can smoothly slide along the wall 100 without difficulty. The lowermost segment 100*a* may be cast or injection molded, for example, and may or may not be composed of plastic or metal. The lowermost segment 100*a* has a chain guide 104 that may be integrally formed thereon. It should be understood that, in use, the chain 84 can directly contact the chain guide 104.

The chain guide 104 includes a first projecting portion 105 that protrudes outwardly a first distance from the surface 106 of wall segment 100*a*. A rib 107, having a smaller width that the first projecting portion 105, protrudes outwardly from the first projecting portion 105 by a second distance. Rib 107 is laterally centered along the first projecting portion 105. The leading edge 108 of chain guide 104 is chamfered to provide a smooth and ramped transition for the chain 84, otherwise, the links of chain 84 could bind on the leading edge 108. Chain guide 104 may be an integral component, as shown, or a separate component that is mounted (welded, fixed, adhered, attached, fastened, coupled, etc.) to the surface 106 of wall segment 100*a*. Alternatively, chain guide 104 may be replaced with one of the chain guides 101 that is described hereinafter.

Wall segment 100*b* is mounted atop wall segment 100*a* such that the surface 109 of wall 105 sits flush with the surface 106 of segment 100*a*. Likewise, wall segment 100*b* is mounted atop wall segment 100*c*. Wall segments may be divided into four or more different sections (for example) to reduce their individual lengths and assist in installation and/or replacement. Chain guide 101 is mounted to wall segment 100*b* such that the trailing edge of chain guide 104 aligns or registers with the chamfered leading edge 102 of chain guide 101.

Figure 5:
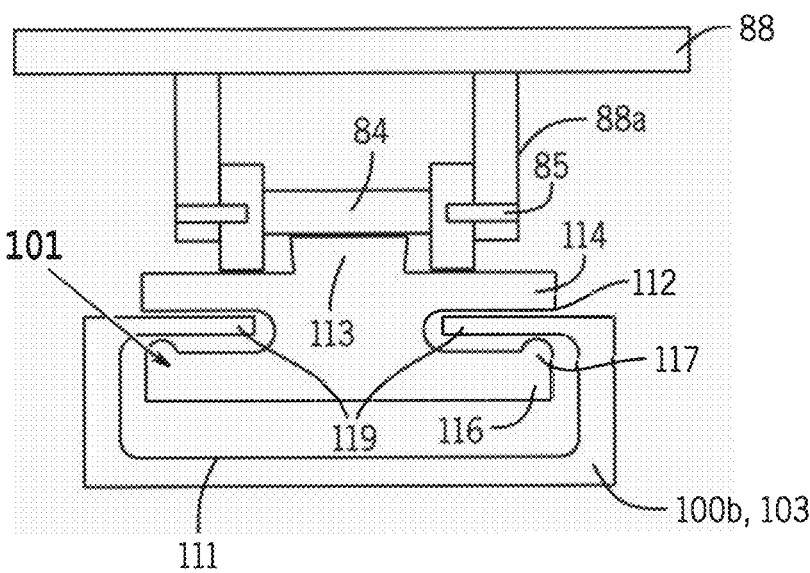
FIG. 5 is a detailed cross-sectional view showing the interaction between the chain, the chain guide and the center dividing wall.

Turning now to FIG. 5, that figure shows an end view of the wall segment 100*b* taken along the lines 5-5 in FIG. 4. It should be understood that chain 84 and one paddle 88 are shown in FIG. 5, however, those components are omitted in FIG. 4. The leading end of wall segment 100*b* includes a bent portion 103 that is not visible in FIG. 4. A cutout 111 is formed in the bent portion 103 as well as surface 109. The cutout 111 extends either entirely or substantially entirely along the entire length 'L' of wall segment 100*b*. It should be understood that wall segment 100*c* is structurally and functionally equivalent to wall segment 100*b*.

A chain guide 101 is mounted to wall segment 100*b*, and the chain guide 101 and wall segment 100*b* may be together considered as a wall assembly. The chain guide 101 comprises a unitary and elongated body having a basic rectangular shape including a top surface, a bottom surface, two side surfaces, a leading front surface and a trailing rear surface. The body may be extruded, for example.

A rectangular shaped rib 113 outwardly protrudes from the top surface, and is centered along the width dimension of the body. In an assembled form of elevator 60, the rib 113 is aligned and registered with the rib 107 of chain guide 104. Chain 84 is positioned over top of rib 113 and slides therealong. The rib 113 may be positioned between the sides of the links of chain 84, as shown in FIG. 5. The rib 113 helps to limit side-to-side movement of chain 84. As shown in FIG. 5, each paddle 88 has lower connection arms 88*a* that are connected to chain 84 by pins 85, for example. It should be understood that the body of the chain guide 101 is not limited to a basic rectangular shape, as viewed in cross-section. The basic body may take any shape, such as circular or partially circular.

A laterally extending cutout 112 is formed on each side surface, thereby dividing each side of the body into two arms, i.e., upper arm 114 and lower arm 116. The lower arm 116 includes an upwardly oriented protuberance 117. In an assembled form of elevator 60, a segment 119 of wall 100*b* is positioned within each cutout 112 at a location between the arms 114 and 116. The protuberance 117 bears on the lower side of the segment 119 of wall 100*b* in an effort to maintain the chain guide 101 fixed in position on wall 100*b*. Protuberance 117 is designed to pinch the sheet metal of wall 100*b* as the chain guide 101 is installed on wall 100*b*, causing resistance and a means of retention. A minimum thickness of the cutout 112, which is measured at the tip of the protuberance 117 is less than the wall thickness of segment 119 to achieve the pinching action. Additionally or alternatively, protuberance 117 could be disposed on the upper arm 114.

To attach chain guide 101 to wall 100*b*, the end of chain guide 101 is guided through cutout 111, and the segments 119 of wall 100*b* are positioned in the respective cutouts 112. The chain guide 101 is then slid onto segments 119 and through the cutout 111 until the chain guide 101 spans nearly the entire length L of wall 100*b*. Chain guides 100 may be easily removed or replaced by sliding the chain guide 101 within the cutout 111.

The interior surfaces of the cutout 112 form 'mating surfaces' for the wall segment 119. It should be understood that the mating surfaces of the chain guide 101 for mounting to the wall can vary. For example, the lower surface of the chain guide 101 may be directly mounted to the wall 106 by adhesive, welds, fasteners and so forth.

Chain guide 101 may be formed from extruded ultra high molecular weight polyethylene (UHMW), for example. Alternatively, chain guide 101 may be formed of any other form of wear resistant plastic or synthetic material. The chain guide 101 may be formed from a different material than the walls 100. Or, the chain guide 101 may be formed from a material having a lower coefficient of friction than the walls 100.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed:

1. A chain guide for a wall of a grain elevator of an agricultural vehicle, the chain guide comprising:

an elongated body having a basic rectangular shape, as viewed in cross-section, including top, bottom and opposing side surfaces;

a rib extending from a surface of the elongated body, the rib being positioned to engage with a chain of the grain elevator; and a mating surface that is either formed on or in the body, wherein the mating surface is connectable to the wall of the grain elevator and disposed on a cutout that is defined on at least one of the opposing side surfaces of the body, and wherein the cutout is sized to receive a portion of the wall.

2. The chain guide of claim 1, wherein the rib is disposed on the top surface of the body.

3. The chain guide of claim 1, wherein the cutout divides the at least one of the opposing side surfaces into an upper arm and a lower arm, and the portion of the wall is positioned in a space defined between the upper arm and the lower arm.

4. The chain guide of claim 1, further comprising a protuberance extending from one of the upper arm and the lower arm in a direction toward the other of the upper arm and the lower arm.

5. The chain guide of claim 1, further comprising another cutout that is defined on the other side surface of the body.

6. The chain guide of claim 1, wherein a minimum thickness of the cutout is less than a wall thickness of the wall.

7. The chain guide of claim 1, wherein the body is formed from plastic.

8. A wall assembly comprising the chain guide of claim 1, the wall assembly comprising the wall and the chain guide, wherein the chain guide is mounted to the wall.

9. An assembly comprising a plurality of wall assemblies of claim 8 that are aligned along a single axis such that the chain guides are also aligned along the single axis.

10. A grain elevator comprising the assembly of claim 9.

11. A combine harvester comprising the grain elevator of claim 10.

12. A wall assembly for a grain elevator of an agricultural vehicle, the wall assembly comprising:

a wall including a cutout extending across a length of the wall;

a chain guide extending across the length of the wall and mounted to the cutout in the wall, the chain guide comprising:

an elongated body;

a rib extending from a surface of the elongated body, the rib being positioned to engage with a chain of the grain elevator; and a mating surface that is either formed on or in the body, wherein the mating surface is connectable to the wall and engaged with a portion of the wall in which the cutout is formed.

13. The wall assembly of claim 8, wherein the body is formed from plastic and the wall is formed from metal.

* * * * *